(12) United States Patent
Shavell et al.

(10) Patent No.: US 10,044,835 B1
(45) Date of Patent: Aug. 7, 2018

(54) REDUCING REDUNDANT TRANSMISSIONS BY POLLING CLIENTS

(71) Applicant: Symantec Corporation, Mountain View, CA (US)

(72) Inventors: Michael Shavell, Merrimack, NH (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 856 days.

(21) Appl. No.: 14/103,610

(22) Filed: Dec. 11, 2013

(51) Int. Cl.
*G06F 15/16* (2006.01)
*H04L 29/06* (2006.01)

(52) U.S. Cl.
CPC .................... *H04L 67/42* (2013.01)

(58) Field of Classification Search
CPC . H04L 67/12; H04L 12/2803; H04L 12/2814; H04L 12/2823; H04L 67/10; H04L 69/26; H04L 2012/285; H04L 45/00; G06F 11/3495; G06F 9/54; G06F 8/65; G06F 5/10; G06F 15/01
See application file for complete search history.

(56) References Cited

U.S. PATENT DOCUMENTS

| | | | |
|---|---|---|---|
| 5,668,810 A | 9/1997 | Cannella, Jr. | |
| 5,680,610 A | 10/1997 | Smith et al. | |
| 5,689,706 A | 11/1997 | Rao et al. | |
| 5,727,159 A | 3/1998 | Kikinis | |
| 5,764,897 A | 6/1998 | Khalidi | |
| 5,799,305 A | 8/1998 | Bortvedt et al. | |
| 5,832,512 A | 11/1998 | Mastors et al. | |
| 5,848,070 A | 12/1998 | Durvaux et al. | |
| 5,848,352 A | 12/1998 | Dougherty et al. | |
| 5,864,851 A | 1/1999 | Breitbart et al. | |
| 5,987,518 A | 11/1999 | Gotwald | |
| 5,999,931 A | 12/1999 | Breitbart et al. | |
| 6,173,293 B1 | 1/2001 | Thekkath et al. | |
| 6,189,017 B1 | 2/2001 | Ronstrom et al. | |
| 6,192,082 B1 | 2/2001 | Moriarty et al. | |

(Continued)

FOREIGN PATENT DOCUMENTS

EP   2398268 A1   12/2011
WO   0024192 A1   4/2000

(Continued)

OTHER PUBLICATIONS

International Search Report and Written Opinion in International Application No. PCT/US2015/057429, dated Jan. 19, 2016, 9 pages.

(Continued)

*Primary Examiner* — Arvin Eskandarnia
*Assistant Examiner* — Thao Duong
(74) *Attorney, Agent, or Firm* — Rory D. Rankin; Meyertons, Hood, Kivlin, Kowert Goetzel, P.C.

(57) ABSTRACT

Systems and methods for optimized polling. An example method may comprise: receiving, over a transport layer connection, a first application layer request comprising a payload; storing, by a processing device, the payload in a memory; forwarding the payload to an application layer; receiving, over the transport layer connection, a second application layer request comprising no payload; and forwarding the payload to the application layer.

16 Claims, 5 Drawing Sheets

(56) References Cited

U.S. PATENT DOCUMENTS

| | | | |
|---|---|---|---|
| 6,216,126 | B1 | 4/2001 | Ronstrom |
| 6,263,437 | B1 | 7/2001 | Liao et al. |
| 6,338,146 | B1 | 1/2002 | Johnson et al. |
| 6,381,617 | B1 | 4/2002 | Frolund et al. |
| 6,397,259 | B1 | 5/2002 | Lincke et al. |
| 6,434,555 | B1 | 8/2002 | Frolund et al. |
| 6,490,595 | B1 | 12/2002 | Candee et al. |
| 6,625,604 | B2 | 9/2003 | Muntz et al. |
| 6,659,860 | B1 | 12/2003 | Yamamoto et al. |
| 6,748,381 | B1 | 6/2004 | Chao et al. |
| 6,782,389 | B1 | 8/2004 | Chrin et al. |
| 6,839,769 | B2 | 1/2005 | Needham et al. |
| 6,877,107 | B2 | 4/2005 | Giotta et al. |
| 7,206,805 | B1 | 4/2007 | McLaughlin, Jr. |
| 7,478,400 | B1 | 1/2009 | Banerjee et al. |
| 7,526,085 | B1 | 4/2009 | Bong |
| 7,787,447 | B1 | 8/2010 | Egan et al. |
| 8,713,300 | B2 | 4/2014 | Clifford et al. |
| 2002/0065919 | A1 | 5/2002 | Taylor et al. |
| 2002/0114341 | A1 | 8/2002 | Sutherland et al. |
| 2002/0147815 | A1 | 10/2002 | Tormasov et al. |
| 2003/0115447 | A1 | 6/2003 | Pham et al. |
| 2004/0153642 | A1 | 8/2004 | Plotkin et al. |
| 2005/0058149 | A1* | 3/2005 | Howe .............. H04L 47/10 370/428 |
| 2005/0123003 | A1 | 6/2005 | Bordonaro et al. |
| 2006/0040619 | A1* | 2/2006 | Cho .............. H04W 52/08 455/69 |
| 2006/0062156 | A1 | 3/2006 | Stultz et al. |
| 2006/0285515 | A1* | 12/2006 | Julian .............. H04W 72/12 370/328 |
| 2007/0249379 | A1* | 10/2007 | Bantukul .............. H04W 4/12 455/466 |
| 2009/0125726 | A1 | 5/2009 | Iyer et al. |
| 2009/0257583 | A1 | 10/2009 | Schneider |
| 2010/0027457 | A1* | 2/2010 | Okuda .............. H04B 7/155 370/315 |
| 2010/0074253 | A1 | 3/2010 | Cheriyath et al. |
| 2010/0174740 | A1 | 7/2010 | Ge |
| 2010/0246430 | A1 | 9/2010 | Egan et al. |
| 2010/0250767 | A1 | 9/2010 | Barreto et al. |
| 2010/0274772 | A1 | 10/2010 | Samuels |
| 2011/0185073 | A1* | 7/2011 | Jagadeeswaran ....... H04L 69/16 709/228 |
| 2011/0320617 | A1* | 12/2011 | Annamalaisami .. H04L 63/1458 709/228 |
| 2012/0131083 | A1* | 5/2012 | Goddard .............. H04L 67/02 709/201 |
| 2013/0138800 | A1 | 5/2013 | Gelter et al. |
| 2013/0339509 | A1* | 12/2013 | Johnson .............. H04L 41/14 709/223 |
| 2016/0119238 | A1 | 4/2016 | Jia et al. |

FOREIGN PATENT DOCUMENTS

| | | |
|---|---|---|
| WO | 0106784 A2 | 1/2001 |
| WO | 2007118829 A1 | 10/2007 |
| WO | 2014035896 A2 | 3/2014 |

OTHER PUBLICATIONS

Heys, Howard M., "Analysis of the Statistical Cipher Feedback Mode of Block Ciphers", IEEE Transactions on Computers, Jan. 2003, pp. 77-92, vol. 52, No. 1, IEEE Computer Society Washington, DC, USA.

Extended European Search Report on European Application No. 12150971.5, dated May 8, 2012, 8 pages.

Rowstron et al., "Pastry: Scalable, Decentralized Object Location, and Routing for Large-Scale Peer-to-Peer Systems", Proceedings of the IFIP/ACM International Conference on Distributed Systems Platforms Heidelberg, Nov. 12, 2001, pp. 329-350, Heidelberg, Germany.

Zhao et al., "Tapestry: An Infrastructure for Fault-tolerant Wide-area Location and Routing", University of California Berkeley, Report No. UCB/CSD-01-1141, Apr. 2001, 27 pages.

Stoica et al., "Chord: A Scalable Peer-to-peer Lookup Service for Internet Applications", Proceedings of the 2001 Conference on Applications, Technologies, Architectures, and Protocols for Computer Communications, Aug. 27, 2001, pp. 149-160.

Manku et al., "Symphony: Distributed Hashing in a Small World", Proceedings of the 4th Conference on USENIX Symposium on Internet Technologies and Systems, Mar. 26, 2003, 14 pages.

Kubiatowicz et al., "OceanStore: An Architecture for Global-scale Persistent Storage", ACM SIGPLAN Notices, Nov. 2000, pp. 190-201.

Adya et al., "FARSITE: Federated, Available, and Reliable Storage for an Incompletely Trusted Environment", Proceedings of the 5th Symposium on Operating Systems Design and Implementation, Dec. 2002, 14 pages.

Garcés-Erice et al, "Hierarchical Peer-to-Peer Systems", Parallel Processing Letters, Dec. 2003, 13 pages, vol. 13, Issue 4.

"Lustre: A Scalable, High Performance File System", Cluster File Systems, Inc., Nov. 11, 2002, 13 pages.

Keidar et al., "Increasing the Resilience of Distributed and Replicated Database Systems", Journal of Computer and System Sciences, Dec. 1998, pp. 309-324, vol. 57, Issue 3, https://ac.els-cdn.com/S0022000098915665/1-s2.0-S0022000098915665-main.pdf?_tid=405a8ef8-f0e5-11e7-9811-00000aab0f6b&acdnat=1515025488_c399de9cd563a35e320f76bd34e2a856. [Retrieved Jan. 3, 2018].

Kempster et al., "A More Committed Quorum-Based Three Phase Commit Protocol", Proceedings of the 12th International Symposium on Distributed Computing, Sep. 24, 1998, pp. 246-257, https://pdfs.semanticscholar.org/c7c6/e4a790582b776eca168f60ca27d4bd8d2a3a.pdf. [Retrieved Jan. 3, 2018].

Iwao et al., "Large Scale Peer-to-Peer Experiments with Virtual Private Community (VPC) Framework", Proceedings of the 6th International Workshop on Cooperative Information Agents VI, Sep. 18, 2002, pp. 66-81.

NG et al "BestPeer: A Self-Configurable Peer-to-Peer System", Proceedings of the 18th International Conference on Data Engineering, Feb. 26-Mar. 1, 2002, 21 pages.

\* cited by examiner

REDUCING REDUNDANT TRANSMISSIONS BY POLLING CLIENTS

TECHNICAL FIELD

The present disclosure is generally related to distributed computer systems, and is more specifically related to systems and methods for reducing the amount of redundant information being transmitted by polling clients.

BACKGROUND

In various applications, a client may periodically poll a server to request software updates, configuration settings, log events, policy updates, and/or other arbitrary data. A request body may comprise data to be utilized by the server for producing the response, for example, the client hardware and/or software configuration needed for selecting the required software updates.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for reducing the amount of redundant information being transmitted by polling clients.

"Client" herein shall refer to a process initiating a communication session by sending a request to a server, and to a computer system executing such process; if the distinction between the process and the computer system should be made, the terms "client process" and "client computer systems" may be used.

"Server" herein shall refer to a process receiving and responding to the client communications, as well as to a computer system executing such process; if the distinction between the process and the computer system should be made, the terms "server process" and "server computer systems" may be used.

"Client" and "server" designations herein are relative, rather than absolute: the same computer system (or process executed by such computer system) may simultaneously act as a server towards one computer system (or process executed by such computer system) and as a client towards another computer system (or process executed by such computer system). For example, an HTTP server may act as a "server" with respect to a browser executed by a client device, and may at the same time act as an HTTP client transmitting HTTP requests to an application server; the latter may in turn act as a database client with respect to a database server.

"Network layer," "transport layer," "session layer," "presentation layer," and "application layer" herein shall refer to the respective layers defined by the Open Systems Interconnection (OSI) model (ISO/IEC 7498-1).

In certain implementations, a client may periodically transmit polling requests to a server over a chosen transport-layer protocol. The requests may comprise one or more application protocol headers and a payload. The latter may be represented by application-specific arbitrary binary data. Responsive to receiving a polling request, the server may respond by transmitting back to the requesting client the requested information in the form of application-specific arbitrary binary data.

In an illustrative example, a polling request may comprise a client system configuration (including, e.g., hardware configuration and/or software configuration) and a server response may comprise one or more software updates for the client. However, the scope of this disclosure is not limited to the particular applications of the polling methods and systems described herein.

As a single server may be utilized to serve requests by multiple clients, the server capacity (e.g., the network channel capacity and/or computational capacity) may become a limiting factor. Hence, reducing the load upon the server may become an important aspect of the overall system design and performance.

The processing load upon the server may be reduced by eliminating at least some overhead associated with the network and transport layers. In an illustrative example, the overhead associated with establishing a transport-layer connection may be reduced by keeping the connection alive for a period of time encompassing several request-response information exchanges.

The processing load upon the server may be further reduced by eliminating at least some redundancy in the payloads being transmitted by clients to the server. In certain implementations, a client may send a payload with an initial request, and then avoid repeatedly sending the payload in subsequent requests, if the payload does not need to be modified. The client may inform the server of employing the optimized payload transfer mode, e.g., by a pre-defined header included into the initial request. After having been notified of the optimized payload transfer mode employed by the client, a "sub-application" layer (e.g., represented by the transport, session, presentation, or lower application layer) of the server may cache the initial request payload and then append it to subsequent requests when forwarding those to the application layer, as described in more details herein below.

In certain implementations, combining the optimized payload transfer mode with keeping alive the transport-layer connections may result in significant reduction of the processing load upon the server.

Various aspects of the above referenced methods and systems are described in details herein below by way of examples, rather than by way of limitation.

Figure 1:
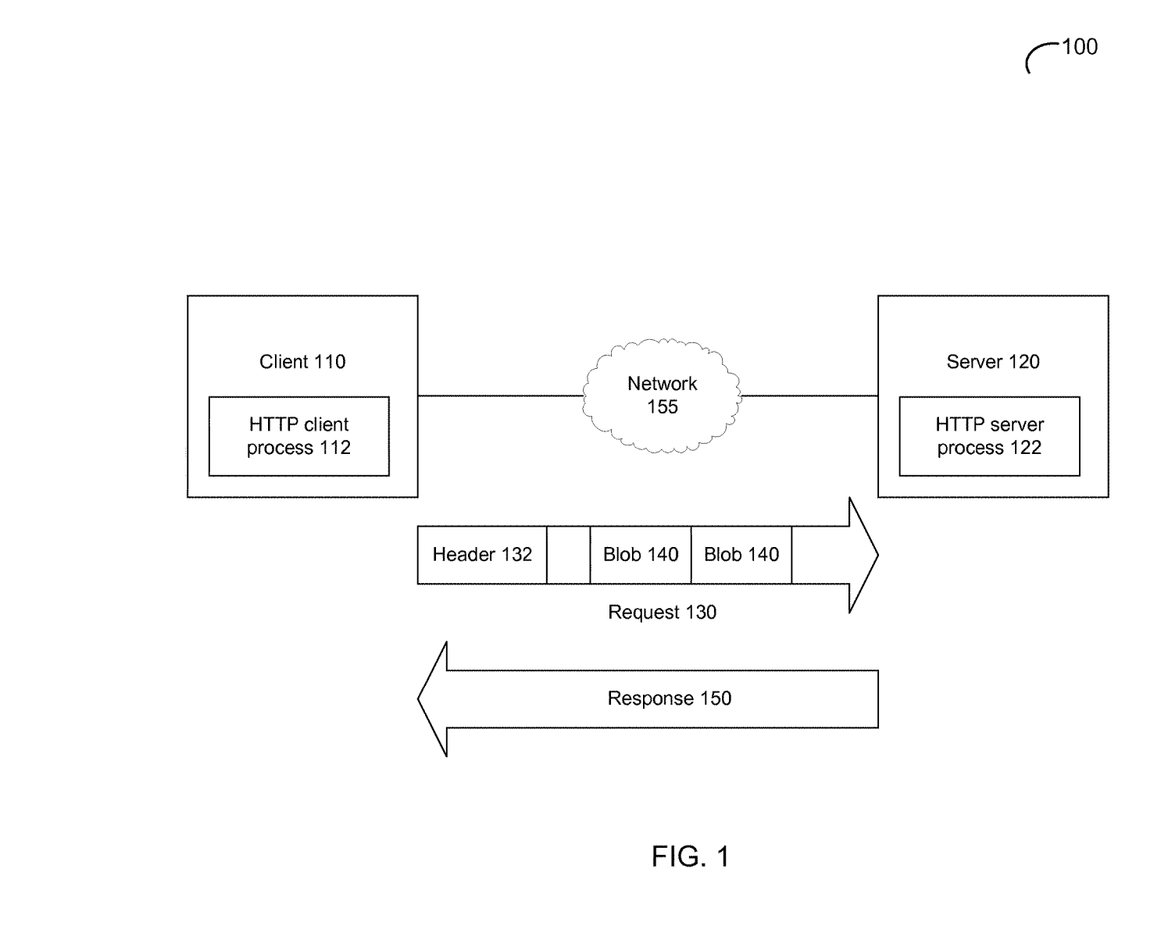
FIG. 1 depicts a high-level component diagram of an example distributed computer system 100 in accordance with one or more aspects of the present disclosure.

FIG. 1 depicts a high-level component diagram of an illustrative example of a distributed computer system 100 in accordance with one or more aspects of the present disclosure. "Computer system" herein shall refer to a system comprising one or more processors, one or more memory devices, and one or more communication interfaces. Distributed computer system 100 may comprise one or more computer systems interconnected by one or more networks.

As schematically illustrated by FIG. 1, distributed computer system 100 may comprise a client computer system 110 accessing a server computer system 120 over one or more networks 155. In illustrative examples, client computer system 110 may be provided by a mobile device, a desktop computer, a server computer, or a virtual machine instance. Likewise, server computer system 120 may be provided by a mobile device, a desktop computer, a server computer, or a virtual machine instance. As "client" and "server" designations herein are relative, the scope of the present disclosure includes both "client to server" communications (such as browser client communicating with an HTTP server) and "server to server communications" (such as an HTTP server communicating with an application server).

Routers, access points, firewalls, load balancers, switches, LAN segments, other networking infrastructure elements, authentication servers, directory servers, application servers, and/or database servers which may be comprised by distributed computer system 100 are omitted from FIG. 1 for clarity.

In certain implementations, client 110 may periodically poll server 120 to request software updates, configuration settings, log events, policy updates or other arbitrary data. A request 130 may comprise data to be utilized by the server for producing the response, for example, the client hardware and/or software configuration needed for selecting the required software updates. In an illustrative example, the request data may comprise one or more binary large objects (blobs) 140. Server 120 may respond by transmitting a response 150 comprising the data requested by the client.

In various implementations, one or more standard or proprietary protocols supporting the request-response paradigm, including HTTP protocol, may be employed by client 110 and server 120 for communicating to each other. In an illustrative example, client 110 may execute an HTTP client process 112 which may be represented by a web browser or other standard or custom HTTP client. Server 120 may execute an HTTP server process 122 which may be represented by a standard or custom HTTP server. Client 110 may encode polling requests as HTTP protocol requests (e.g., PUT, GET, etc.), thus expecting HTTP responses from server 120. If a blob needs to be transmitted to the server, the client may utilize an HTTP PUT request including the blob in the request body. One or more standard and/or custom HTTP headers may be used by the client to convey request-specific information to the server.

As noted herein above, the processing load upon the server may be reduced by eliminating at least some overhead associated with the network and/or transport layers. In an illustrative example, the overhead associated with establishing TCP connections may be reduced by keeping the TCP connection alive for a period of time allowing performing several request-response information exchanges. In an illustrative example, client 110 may insert a Connection header specifying keep-alive connection mode into the HTTP requests transmitted to server 120, thus instructing the server not to terminate the TCP connection upon responding to the current HTTP request. Hence, the transport-layer connection may be kept alive until explicitly terminated by the client or by the networking infrastructure on the path from the client to the server.

The extended TCP connection life may be useful in various polling modes. In certain implementations, client 110 and server 120 may implement a "short" polling process calling for the server's responding to each client request, typically, within a defined timeout period. Alternatively, client 110 and server 120 may implement a "long" polling process in which server 120 would only respond to a client request when the server has new or updated data that needs to be transmitted to the client. Alternatively, client 110 and server 120 may implement a polling process combining the features of "short" and "long" polling (e.g., a process in which the server would respond to the client upon the expiration of a pre-defined or dynamically configurable time period which may encompass several client poll periods).

To further reduce the processing load upon the server, clients may eliminate at least some redundancy in the payloads being transmitted to the server. In certain implementations, a client may send a payload within the body of an initial request, and then avoid repeatedly sending the payload in subsequent requests, if the payload does not need to be modified. The client may inform the server of employing the optimized payload transfer mode, e.g., by a Content-Type header or a custom HTTP header. Responsive to receiving the notification of the optimized payload transfer mode employed by the client, the HTTP layer of the server may append the initial payload to subsequent requests when forwarding those to the application layer, as described in more details herein below with references to FIGS. 2-4.

Figure 2:
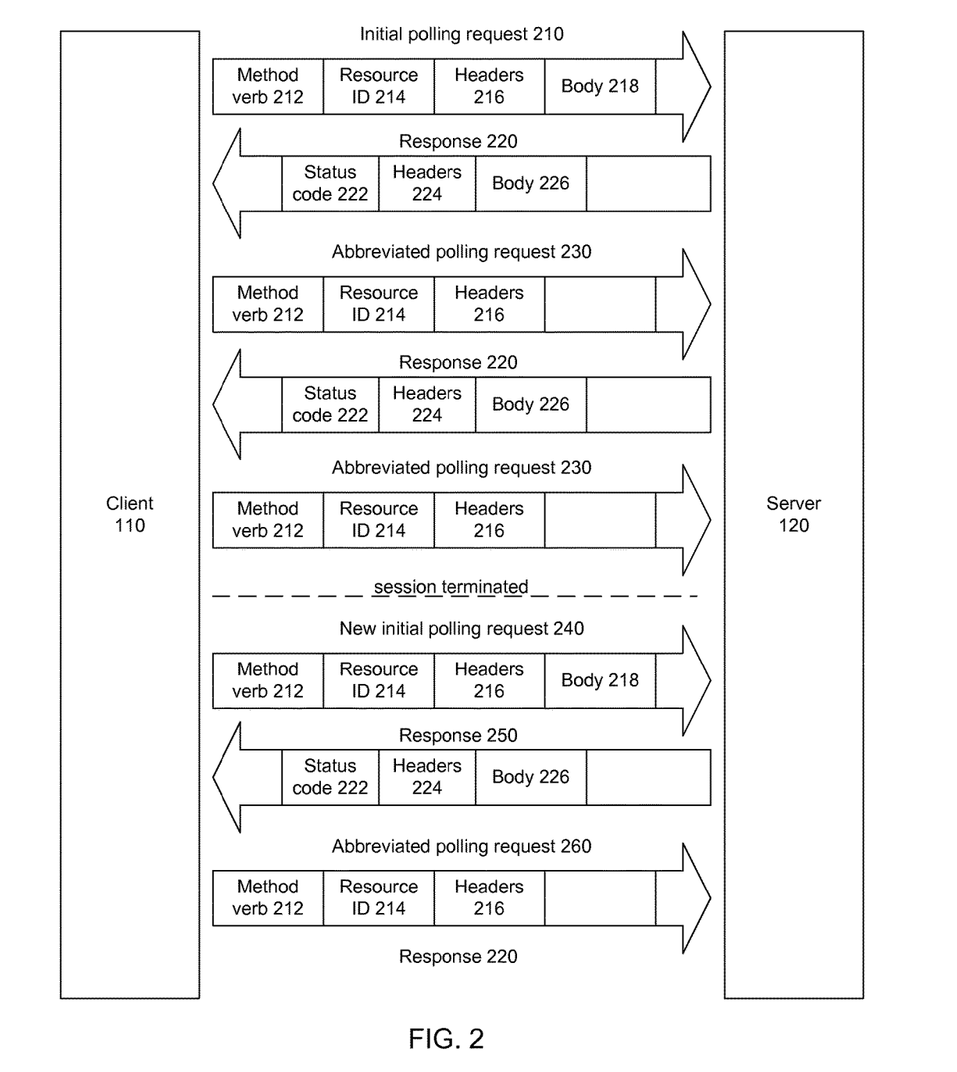
FIG. 2 depicts a request-response diagram of an example polling process, in accordance with one or more aspects of the present disclosure.

FIG. 2 schematically illustrates an example request-response diagram of the polling process in accordance with one or more aspects of the present disclosure. Client 110 may establish a TCP connection with server 120 and transmit an initial polling request 210. In an illustrative example, the initial polling request may comprise an identifier 212 of the method to be applied to a resource (e.g., PUT), an identifier 214 of the resource represented by a Uniform Resource Identifier (URI), one or more request headers 216, and the message body 218 represented by arbitrary textual or binary data (e.g., as specified by a Content-Encoding header), as defined by [RFC2615] Malis, A. and W. Simpson, "PPP over SONET/SDH", RFC 2615, June 1999.

In an illustrative example, initial polling request may be represented by a PUT request comprising a URI, a request body comprising one or more blobs, a header requesting that the TCP connection not be terminated by the server, and a header indicating that the client intends to employ the optimized payload transfer mode in subsequent polling requests. The URI may comprise an identifier of the target location on the server where the contents of the request body should be placed. In certain implementations, the URI may further comprise a communication session identifier which may be represented by an arbitrary text string generated by the client and inserted into a pre-defined location within the URI string. Alternatively, the session identifier may be encoded by a cookie inserted by the server into the first response and then returned by the client in each subsequent request until the communication session is terminated. Alternatively, server 120 may assume that all client requests transmitted within the same TCP connection should be treated as pertaining to the same communication session. Alternatively, server 120 may assume that all client requests transmitted within the same TCP connection and directed to the same resource (e.g., represented by a URI) should be treated as pertaining to the same communication session.

Responsive to receiving initial polling request 210, server 120 may parse to request to determine the request method, extract the request headers and/or the request body. Responsive to determining that the optimized payload transfer mode has been requested by the client, server 120 may cache in its memory one or more blobs extracted from the request body, in addition to forwarding the request body to the application layer for processing.

In certain implementations, the application layer may be represented by the same process as server 120 (e.g., by a custom module within a standard HTTP server or by a custom HTTP server). Alternatively, the application layer may be represented by a dedicated process in communication with server 120 over one or more inter-process communication channels (e.g., over one or more sockets). The application layer processing may comprise analyzing the request body and constructing a response to be transmitted back to the client. In an illustrative example, the polling request may comprise the client system configuration (including, e.g., hardware configuration and/or software configuration) and the server response may comprise the software updates to be installed by the client. In other illustrative example, the client may poll for software updates, configuration settings, log events, policy updates or other arbitrary data.

Responsive to processing request 210, server 120 may transmit a response 220 back to client 110. The response may comprise a response status code 222, one or more response headers 224, and a response body 226. The latter may comprise the data requested by the client (e.g., software updates, configuration settings, log events, policy updates or other arbitrary data). In certain implementations, the response may further comprise an acknowledgement of the optimized payload transfer mode. In an illustrative example, the acknowledgement may be represented by a custom status code 222 or by a response header 224.

Upon receiving the requested payload transfer mode acknowledgement by the server, the client may switch to the optimized payload transfer mode in accordance with one or more aspects of the present disclosure. In the optimized payload transfer mode, client 120 may transfer subsequent requests 230 in an abbreviated form (i.e., without appending one or more blobs that have already been transmitted within the body of initial request 210) unless the body of the request needs to be modified as compared to the contents of the body of initial request 210.

In certain implementations, the abbreviated request 220 may be represented by a GET request comprising a URI matching that of initial request 210, a header requesting that the TCP connection not be terminated by the server, and a header requesting that the server employ the optimized payload transfer mode.

Responsive to determining that abbreviated request 220 belongs to the same communication session as initial request 210, server 120 may forward to the application layer the cached payload that was received within the body of initial request 210, as if the payload has just been received as part of abbreviated request 220.

As schematically illustrated by FIG. 2, client 110 may transmit several abbreviated form requests 220 following initial request 210, until the communication session is terminated by client 110, server 120, or by the networking infrastructure on the path from client 110 to server 120. Server 120 may append the initial payload to each of those requests when forwarding those to the application layer, so that the latter would not be able to distinguish an abbreviated request from its parent initial request that was actually accompanied by the payload.

Responsive to detecting that the connection has been terminated, client 110 may initiate a new communication session by transmitting a new full request 240 comprising one or more blobs in the request body. Client 110 may then transmit several abbreviated form requests 260 which would be processed by server 120 in accordance with the foregoing description.

Figure 3:
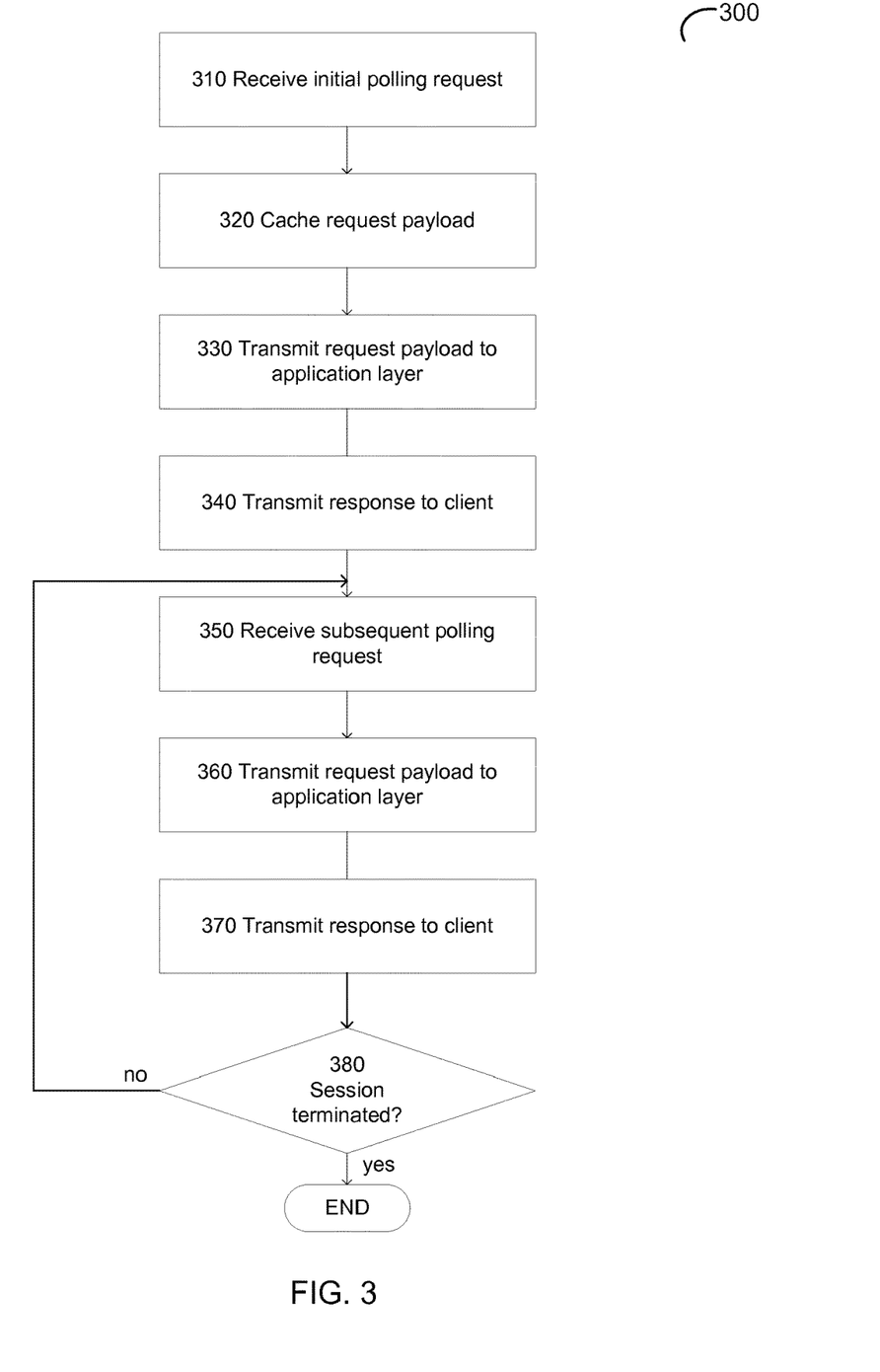
FIGS. 3-4 depict flow diagrams of example polling methods, in accordance with one or more aspects of the present disclosure.

FIG. 3 depicts a flow diagram of an example method 300 for processing, by a server, optimized polling requests. Method 300 and/or each of its individual functions, routines, subroutines, or operations may be performed by one or more processors of a server computer system (e.g., computer system 120 of FIG. 1) servicing polling requests originated by one or more clients. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the server may receive an initial polling request from a client. The initial polling request may be received over a newly established or an existing transport layer connection (e.g., a TCP connection). In an illustrative example, the initial polling request may be represented by an HTTP PUT request. Responsive to determining that the polling request contains an indication of the optimized payload transfer mode that the client intends to employ in subsequent polling requests, as described in more details herein above, the server may, at block 320, cache the request payload by storing it in a memory.

At block 330, the server may transmit the request payload to the application layer, as described in more details herein above.

At block 340, the server may transmit a response back to the client, acknowledging the optimized payload transfer mode.

Responsive to receiving, at block 350, subsequent polling requests the server may, at block 360, transmit the cached payload to the application layer, and transmit, at block 370, a response back to the client, until the communication session is terminated at block 380. The polling requests may be represented by HTTP GET requests comprising no payload, and may be transmitted over the same TCP connection and directed to the same resource (identified by an URI) as the initial polling request. The subsequent polling requests may further reference the same communication session by the session identifier, as described in more details herein above.

Figure 4:
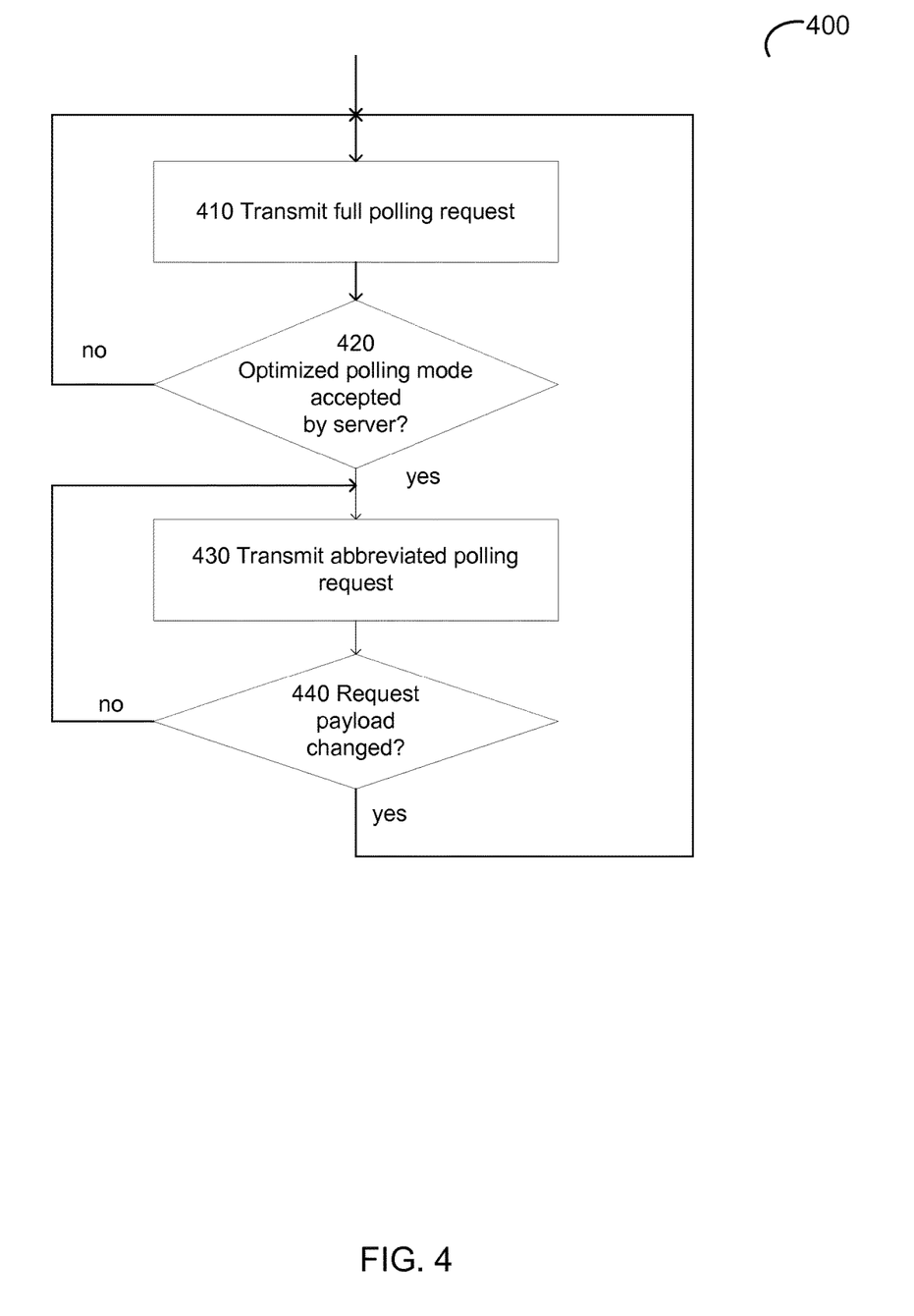

FIG. 4 depicts a flow diagram of an example method 400 for optimized polling. Method 400 and/or each of its individual functions, routines, subroutines, or operations may be performed by one or more processors of a client computer system (e.g., computer system 110 of FIG. 1) periodically transmitting polling requests to a server. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, the polling client may establish a transport layer connection with a server and transmit an initial polling request. The transport layer connection may be provided by a TCP connection. The initial polling request may be represented by an HTTP PUT request comprising a resource identifier (represented, e.g., by a URI), a request body comprising one or more blobs, a header requesting that the TCP connection not be terminated by the server, and a header indicating that the client intends to employ an optimized payload transfer mode in subsequent polling requests, as described in more details herein above.

Responsive to ascertaining, at block 420, that the server accepted the optimized polling mode, the client may, at block 430 transmit the subsequent polling requests as abbreviated polling requests, as described in more details herein above, until the client determines that the request payload should be changed. The polling requests may be represented by HTTP GET requests comprising no payload, and may be transmitted over the same TCP connection and directed to the same resource (identified by an URI) as the initial polling request. The subsequent polling requests may further reference the same communication session by the session identifier, as described in more details herein above.

Responsive to determining, at block 440, that a new request payload should be transmitted to the server, the client may loop back to block 410 and transmit a new full polling request.

While the foregoing illustrative examples employ HTTP protocol as defined by [RFC2615], in other implementations of the methods described herein, various other standard or proprietary protocols supporting the request-response paradigm may be employed by client 110 and server 120 for communicating to each other. Also, while the foregoing illustrative examples employ the short polling method, according to which the server responds to each client request, in other implementations of the methods described herein, various other polling methods may be implemented, such as the long polling method, according to which the server would only respond to a client request when the server has new or updated data that needs to be transmitted to the client, as well as other polling methods.

Figure 5:
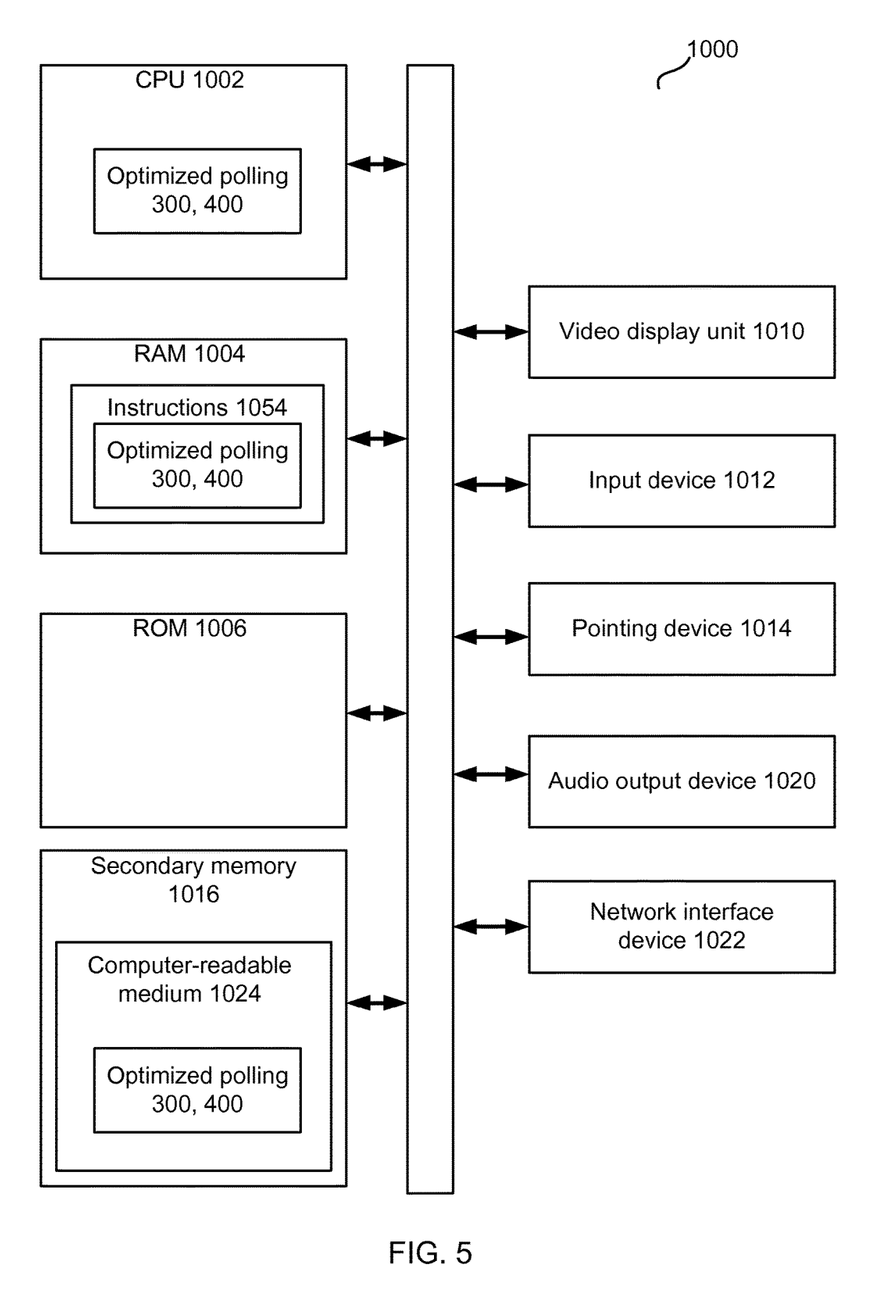
FIG. 5 depicts a block diagram of an illustrative computer system operating in accordance with examples of the present disclosure.

FIG. 5 depicts an example computer system 1000 within which a set of instructions, for causing the computer system to perform any one or more of the methods described herein, may be executed. In illustrative examples, the computer system 1000 may correspond to client computer system 110 and/or server computer system 120 of FIG. 1.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" may include any collection of computers that individually or jointly execute a set (or multiple sets) of instructions to perform any one or more of the methods described herein.

In a further aspect, computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may include a non-transitory computer-readable storage medium 1024 on which may be stored instructions of methods 300 and/or 400 for optimized polling in accordance with one or more aspects of the present disclosure. Instructions of methods 300 and/or 400 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative example of FIG. 5 as a single medium, the term "computer-readable storage medium" may include a single medium or multiple media (e.g., a centralized or distributed database, and/or associated caches and servers) that store the one or more sets of executable instructions. The term "computer-readable storage medium" may also include any non-transitory medium that is capable of storing or encoding a set of instructions for execution by a computer that cause the computer to perform any one or more of the methods described herein. The term "computer-readable storage medium" may include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform functions, routines, subroutines, or operations of the methods described herein. The required structure for a variety of these systems will appear as set forth in the description above.

The above description is intended to be illustrative, and not restrictive. Although the present disclosure has been described with references to specific illustrative examples and implementations, it will be recognized that the present disclosure is not limited to the examples described. The scope of the disclosure should be determined with reference to the following claims, along with the full scope of equivalents to which the claims are entitled.

What is claimed is:

1. A method, comprising:
   receiving, from a client over a transport layer connection, a first application layer request comprising a payload that includes an indication that the client intends to employ an optimized payload transfer mode in which a second application layer request will not include a payload;
   in response to detecting the indication in the first application layer request:
      storing, by a processing device, a copy of the payload in a memory; and
      conveying a response acknowledging the optimized payload transfer mode;
   sending the payload to an application layer;
   receiving, from the client over the transport layer connection, the second application layer request, wherein the second application layer request pertains to a same communication session as the first application layer request, and wherein the second application layer request does not comprise the payload; and
   responsive to receiving the second application layer request, sending the stored payload from the memory to the application layer.

2. The method of claim 1, wherein the transport layer connection is provided by a TCP connection.

3. The method of claim 1, wherein the first application layer request is provided by a first HTTP request and the second application layer request is provided by a second HTTP request.

4. The method of claim 1, wherein the first application layer request comprises a header requesting that the transport layer connection be kept alive.

5. The method of claim 1, wherein the first application layer request and the second application layer request both include data that identifies a same uniform resource identifier (URI), wherein the URI comprises an identifier of a target location on the server where contents of a body of the first application layer request and second application layer request should be placed.

6. The method of claim 1, wherein the first application layer request and the second application layer request comprise a session identifier identifying the same communication session.

7. The method of claim 1, further comprising confirming, to a sender of the first application layer request, that the payload is stored in response to the first application layer request.

8. The method of claim 1, further comprising sending the stored payload from the memory to the application layer responsive to receiving a subsequent application layer request pertaining to the same communication session.

9. A method, comprising:
   transmitting, from a client over a first transport layer connection, a first application layer request to a server, the first application layer request comprising a payload and an indication in the request that the client intends to employ an optimized payload transfer mode in which a second application layer request will not include a payload, wherein the indication is configured to cause the server to store a copy of the payload in a memory and send the stored payload to an application layer responsive to receiving the second application layer request that does not include the payload;
   in response to the first application layer request, receiving from the server an indication that the server accepts the optimized payload transfer mode;
   transmitting, over the transport layer connection, the second application layer request comprising no payload, wherein the second application layer request pertains to a same communication session as the first application layer request.

10. The method of claim 9, wherein the transport layer connection is provided by a TCP connection.

11. The method of claim 9, wherein the first application layer request and the second application layer request both include data that identifies a same uniform resource identifier (URI), wherein the URI comprises an identifier of a target location on the server where contents of a body of the first application layer request and second application layer request should be placed.

12. The method of claim 9, wherein the first application layer request comprises a header requesting that the transport layer connection be kept alive.

13. A computer system comprising:
   a memory; and
   one or more processors, coupled to the memory, to:
      receive, from a client over a transport layer connection, a first application layer request comprising a payload that includes an indication that the client intends to employ an optimized payload transfer mode in which a second application layer request will not include a payload;
      in response to detecting the indication in the first application layer request:
         store a copy of the payload in the memory; and
         convey a response to the client acknowledging the optimized payload transfer mode
      send the payload to an application layer;
      receive, from the client over the transport layer connection, the second application layer request, wherein the second application layer request pertains to a same communication session as the first application layer request, and wherein the second application layer request does not comprise the payload; and
      responsive to receiving the second application layer request, send the stored payload to the application layer.

14. The computer system of claim 13, wherein the processors are further to:

send the stored payload from the memory to the application layer responsive to receiving a subsequent application layer request pertaining to the same communication session.

15. A computer-readable non-transitory storage medium comprising executable instructions that, when executed by a computer system, cause the computer system to perform operations comprising:

receiving, from a client over a transport layer connection, a first application layer request comprising a payload that includes an indication that the client intends to employ an optimized payload transfer mode in which a second application layer request will not include a payload;

in response to detecting the indication in the first application layer request:
storing a copy of the payload in a memory; and
conveying a response acknowledging the optimized payload transfer mode;

sending the payload to an application layer;

receiving, from the client over the transport layer connection, the second application layer request, wherein the second application layer request pertains to a same communication session as the first application layer request, and wherein the second application layer request does not comprise the payload; and responsive to receiving the second application layer request, sending the stored payload from the memory to the application layer.

16. The computer-readable non-transitory storage medium of claim 15, further comprising executable instructions that cause the computer system to perform operations comprising:

sending the stored payload from the memory to the application layer responsive to receiving a subsequent application layer request pertaining to the same application layer session.

* * * * *